United States Patent
Mayer et al.

(10) Patent No.: US 12,530,798 B2
(45) Date of Patent: Jan. 20, 2026

(54) LEARNED FORENSIC SOURCE SYSTEM FOR IDENTIFICATION OF IMAGE CAPTURE DEVICE MODELS AND FORENSIC SIMILARITY OF DIGITAL IMAGES

(71) Applicant: Drexel University, Philadelphia, PA (US)

(72) Inventors: Owen Mayer, Philadelphia, PA (US); Matthew C. Stamm, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 551 days.

(21) Appl. No.: 17/599,872

(22) PCT Filed: Mar. 30, 2020

(86) PCT No.: PCT/US2020/025784
§ 371 (c)(1),
(2) Date: Sep. 29, 2021

(87) PCT Pub. No.: WO2020/205771
PCT Pub. Date: Oct. 8, 2020

(65) Prior Publication Data
US 2022/0198711 A1    Jun. 23, 2022

Related U.S. Application Data

(60) Provisional application No. 62/825,842, filed on Mar. 29, 2019.

(51) Int. Cl.
*G06T 7/80* (2017.01)
(52) U.S. Cl.
CPC ...... *G06T 7/80* (2017.01); *G06T 2207/10024* (2013.01); *G06T 2207/20081* (2013.01); *G06T 2207/20084* (2013.01)

(58) Field of Classification Search
CPC .... G06T 7/80; G06T 7/85; G06T 7/90; G06T 7/97; G06T 7/60; G06T 7/10;
(Continued)

(56) References Cited

U.S. PATENT DOCUMENTS

| 7,779,032 B1 | 8/2010 | Garfinkel |
| 2010/0037059 A1* | 2/2010 | Sun ............... H04N 1/32144 713/176 |

(Continued)

FOREIGN PATENT DOCUMENTS

WO    2019002602 A1    1/2019

OTHER PUBLICATIONS

@article{DBLP:journals/corr/abs-1808-08396, author = {Davide Cozzolino and Luisa Verdoliva}, title = {Noiseprint: a CNN-based camera model fingerprint}, journal = {CoRR}, volume = {abs/1808.08396}, year = {2018}, url= {http://arxiv.org/abs/1808.08396}, timestamp = {Sun, Sep. 2, 2018 15:01:54 +0200}, (Year: 2018).*

(Continued)

*Primary Examiner* — Oneal R Mistry
*Assistant Examiner* — Duy Tran
(74) *Attorney, Agent, or Firm* — Schott, P.C.

(57) ABSTRACT

Information about an image's source camera model is important knowledge in many forensic investigations. In this paper the system(s) pro-pose a system that compares two image patches to determine if they were captured by the same camera model. To do this, the system(s) first train a CNN based feature extractor to output generic, high level features which encode information about the source camera model of an image patch. Then, the system(s) learn a similarity measure that maps pairs of these features to a score indicating whether the two image patches were captured by the same or different camera models. The system(s) show that the proposed system accurately determines if two (Continued)

patches were captured by the same or different camera models, even when the camera models are unknown to the investigator. The system(s) also demonstrate the utility of this approach for image splicing detection and localization.

8 Claims, 7 Drawing Sheets

(58) Field of Classification Search
CPC .......... G06T 7/246; G06T 7/248; G06T 7/33; G06T 7/337; G06T 7/73; G06T 7/74; G06T 2207/10024; G06T 2207/20081; G06T 2207/20084
See application file for complete search history.

(56) References Cited

U.S. PATENT DOCUMENTS

| | | | |
|---|---|---|---|
| 2010/0111370 A1* | 5/2010 | Black | G06F 18/2321 705/26.1 |
| 2010/0287196 A1 | 11/2010 | Shields et al. | |
| 2012/0087589 A1* | 4/2012 | Chang-Tsun | G06F 18/23211 382/190 |
| 2014/0169617 A1 | 6/2014 | Pollard et al. | |
| 2014/0380493 A1 | 12/2014 | Sun et al. | |
| 2015/0358344 A1 | 12/2015 | Mumcuoglu et al. | |
| 2017/0091588 A1* | 3/2017 | Liu | G06T 7/0002 |
| 2018/0005032 A1 | 1/2018 | McClouskey | |
| 2018/0181592 A1 | 6/2018 | Chen et al. | |
| 2018/0232605 A1 | 8/2018 | Chen et al. | |
| 2019/0057268 A1* | 2/2019 | Burge | G06V 10/82 |

OTHER PUBLICATIONS

Mayer O, Stamm MC. Learned Forensic Source Similarity for Unknown Camera Models. In2018 IEEE International Conference on Acoustics, Speech and Signal Processing (ICASSP) Jan. 1, 2018 (pp. 2012-2016). IEEE. (Year: 2018).*

Cozzolino D, Verdoliva L. Noiseprint: a CNN-based camera model fingerprint. arXiv preprint arXiv:1808.08396. Aug. 25, 2018. (Year: 2018).*

Li Y. A robust forensic method based on scale-invariance feature transform. In2011 International Conference on Multimedia Technology Jul. 26, 2011 (pp. 5246-5249). IEEE. (Year: 2011).*

Mayer O, Stamm MC. Learned forensic source similarity for unknown camera models. In2018 IEEE International Conference on Acoustics, Speech and Signal Processing (ICASSP) Apr. 15, 2018 (pp. 2012-2016). IEEE. (Year: 2018).*

Written Opinion issued from the International Searching Authority within the International Application No. PCT/US2020/025784, Jul. 16, 2020, 5 pages.

International Search Report issued within the International Application No. PCT/US2020/025784, mailed Jul. 28, 2020, 3 pages.

Anderson Rocha et al., "Vision of the Unseen", ACM Computing Surveys, ACM, New York, NY, vol. 43, No., 4, Oct. 18, 2011, pp. 1-42.

Pin Zhang et al., "Detecting Image Tampering Using Feature Fusion", Availability, Reliability and Security, Intentional Conference on IEEE, Piscataway NJ., Mar. 16, 2009, pp. 335-340.

Extended European Search Report, issued by the European Patent Office within the International Patent Application No. PCT/US2020025784 on Novebmer 15, 2022, 9 pages.

* cited by examiner

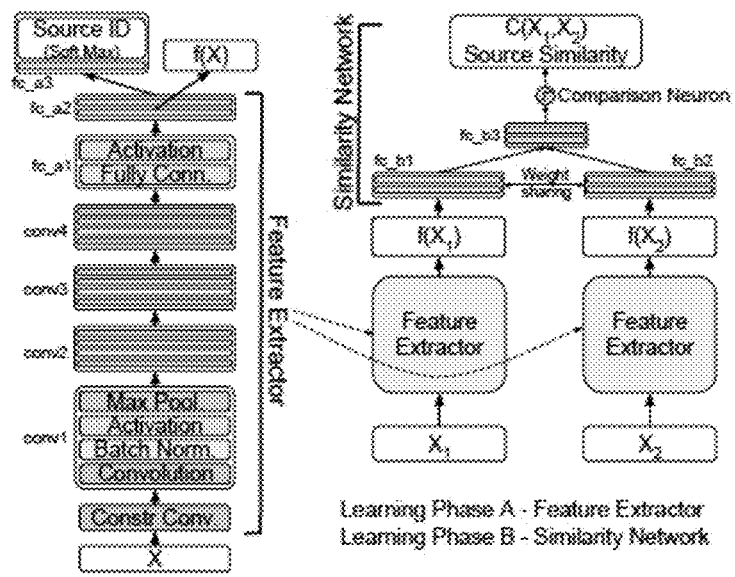
FIG. 1.1
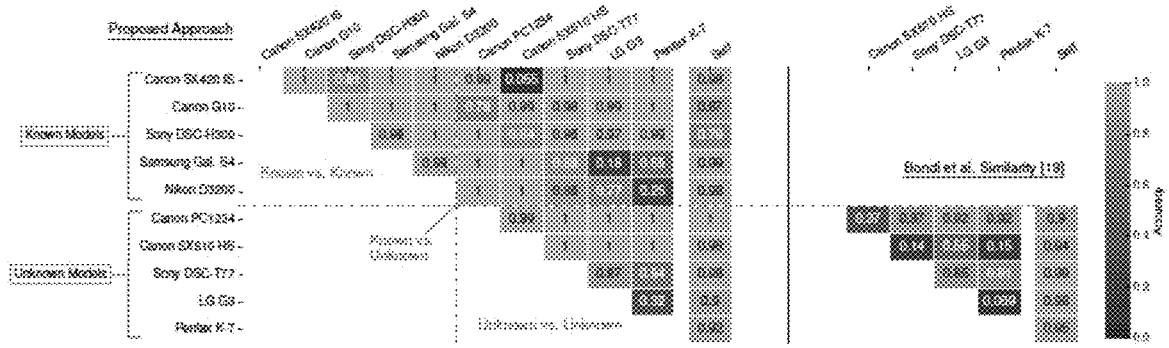
FIG. 1.2

FIG. 1.3(a)
FIG. 1.3(b)
FIG. 1.3(c)
FIG. 1.3(d)
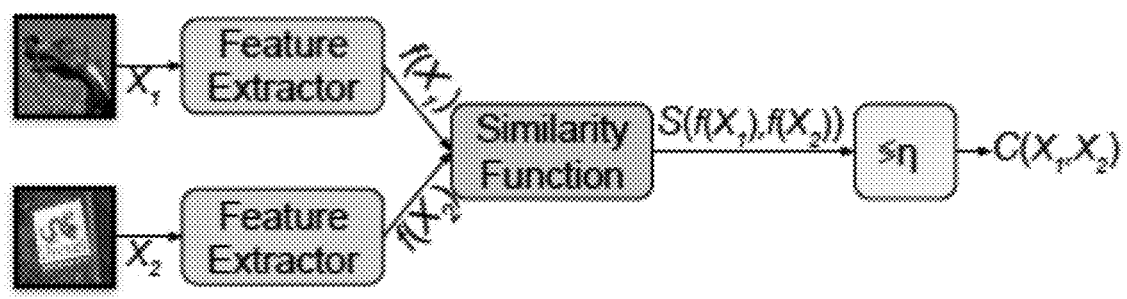
FIG. 2.1

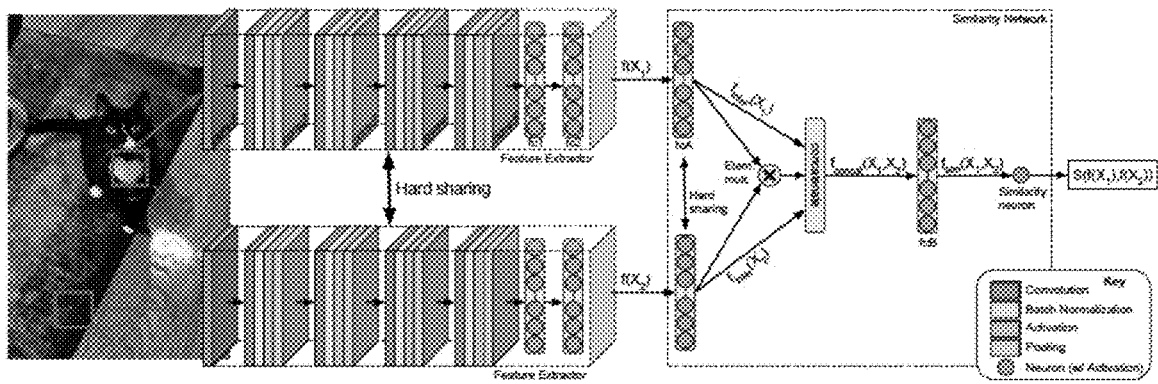
FIG. 2.2
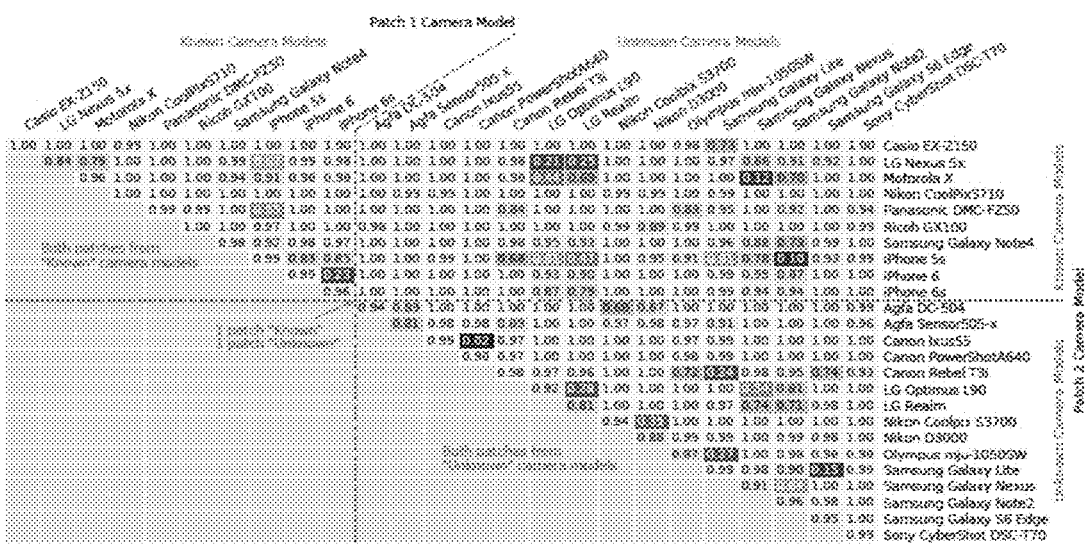
FIG. 2.3

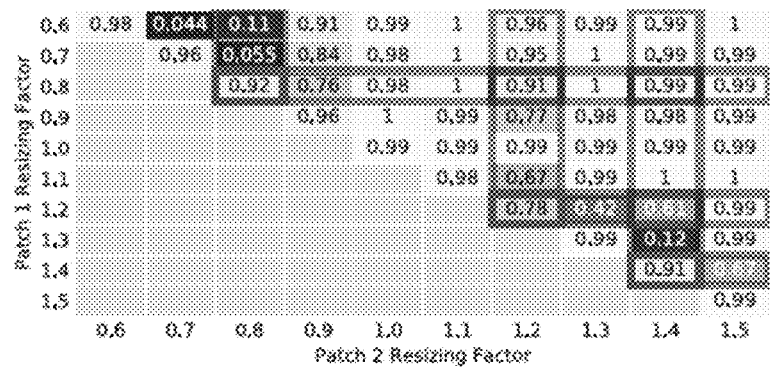
FIG. 2.4
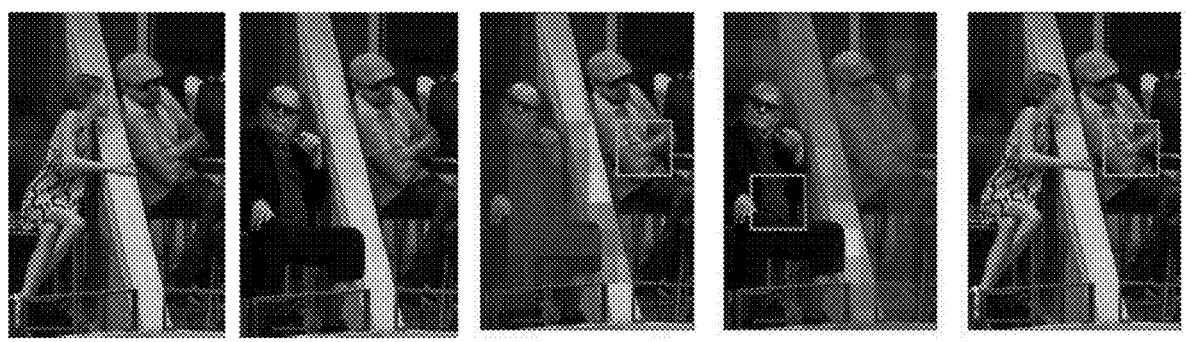
FIG. 2.5(a)   FIG. 2.5(b)   FIG. 2.5(c)   FIG. 2.5(d)   FIG. 2.5(e)
FIG. 2.5(f)   FIG. 2.5(g)   FIG. 2.5(h)   FIG. 2.5(i)

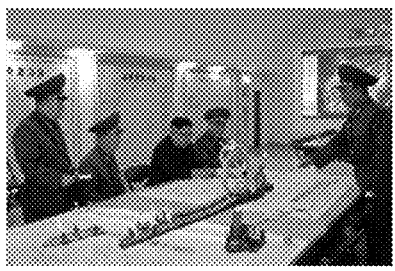
FIG. 2.6(a)
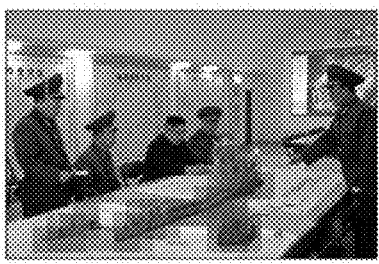
FIG. 2.6(b)
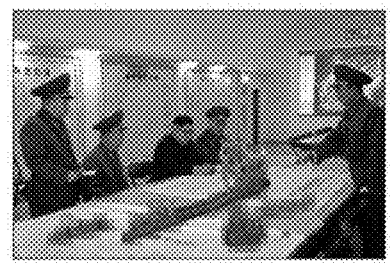
FIG. 2.6(c)
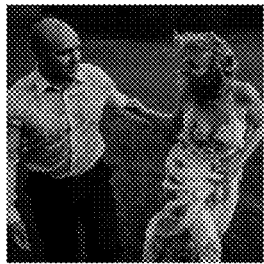
FIG. 2.7(a)
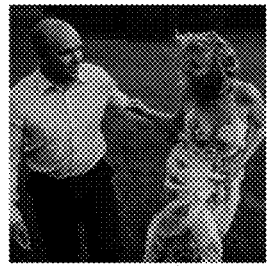
FIG. 2.7(b)
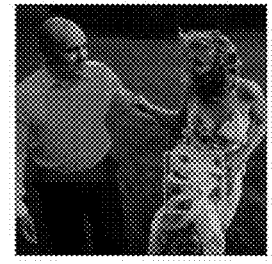
FIG. 2.7(c)
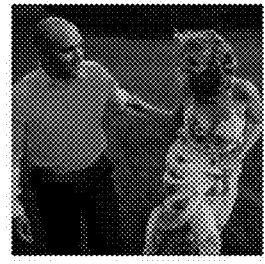
FIG. 2.7(d)

TABLE I
CAMERA MODELS USED IN TRAINING (SETS A AND B) AND TESTING (SET C). NOTE THAT $A \cap B = A \cap C = B \cap C = \emptyset$.
*DENOTES FROM THE DRESDEN IMAGE DATABASE [31]

| Camera model set A | | | | | |
|---|---|---|---|---|---|
| Apple iPhone 4 | Canon PC1730 | Huawei Honor 5x | Nikon Coolpix S7000 | Praktica DCZ5.9* | Sony DSC-W800 |
| Apple iPhone 4s | Canon Powershot A580 | LG G2 | Nikon Coolpix S710* | Ricoh GX100* | Sony DSC-WX350 |
| Apple iPhone 5 | Canon Powershot ELPH 160 | LG G3 | Nikon D200* | Kodak RCP-7325XS* | Sony DSC-H50* |
| Apple iPhone 5s | Canon Powershot S100 | LG Nexus 5x | Nikon D3200 | Samsung Galaxy Note4 | Sony DSC-T77* |
| Apple iPhone 6 | Canon Powershot SX530 HS | Motorola Droid Maxx | Nikon D7100 | Samsung Galaxy S2 | Sony NEX-5TL |
| Apple iPhone 6+ | Canon Powershot SX420 IS | Motorola Droid Turbo | Panasonic DMC-FZ50* | Samsung Galaxy S4 | |
| Apple iPhone 6s | Canon SX610 HS | Motorola X | Panasonic FZ200 | Samsung L74wide* | |
| Agfa Sensor530s* | Casio EX-Z150* | Motorola XT1060 | Pentax K-7 | Samsung NV15* | |
| Canon EOS SL1 | Fujifilm FinePix S8600 | Nikon Coolpix S33 | Pentax OptioA40* | Sony DSC-H300 | |
| Camera model set B | | | | | |
| Apple iPad Air 2 | Canon Ixus70* | Fujifilm FinePix XP80 | LG Nexus 5 | Olympus Stylus TG-860 | Samsung Galaxy S3 |
| Apple iPhone 5c | Canon PC1234 | Fujifilm FinePix J50* | Motorola Nexus 6 | Panasonic TS30 | Samsung Galaxy S5 |
| Agfa DC-733s* | Canon Powershot G10 | HTC One M7 | Nikon D70* | Pentax OptioW60* | Samsung Galaxy S7 |
| Agfa DC-830i* | Canon Powershot SX400 IS | Kodak EasyShare C813 | Nikon D7000 | Samsung Galaxy Note3 | Sony A6000 |
| Blackberry Leap | Canon T3i | Kodak M1063* | Nokia Lumia 920 | Samsung Galaxy Note5 | Sony DSC-W170* |
| Camera model set C | | | | | |
| Agfa DC-504* | Canon Powershot A640* | LG Realm | Olympus mju-1050SW* | Samsung Galaxy Note2 | |
| Agfa Sensor505x* | Canon Rebel T3i | Nikon Coolpix S3700 | Samsung Galaxy Lite | Samsung Galaxy S6 Edge | |
| Canon Ixus55* | LG Optimus L90 | Nikon D3000 | Samsung Galaxy Nexus | Sony DSC-T70 | |

FIG. 2.8.1

TABLE II
ACCURACY OF CAMERA MODEL COMPARISON ON DIFFERENT PATCH TYPES. PATCH PAIRS FROM 10 KNOWN (K), 15 UNKNOWN (U) CAMERA MODELS, WITH OR WITHOUT SECOND JPEG COMPRESSION QF=95.

| Patch size | JPEG | $K,K$ | $K,U$ | $U,U$ | Total |
|---|---|---|---|---|---|
| 256×256 | None | 95.19% | 93.27% | 92.22% | 93.61% |
| 128×128 | None | 94.54% | 91.22% | 90.07% | 92.02% |
| 256×256 | QF=95 | 94.00% | 91.22% | 90.15% | 91.83% |
| 128×128 | QF=95 | 90.55% | 87.64% | 87.37% | 88.63% |

FIG. 2.8.2

TABLE III
COMPARISON TO OTHER SIMILARITY MEASURES

| Distance Measure | Accuracy | Learned Measure | Accuracy |
|---|---|---|---|
| 1 Norm | 93.06% | MS'18 [19] | 85.70% |
| 2 Norm | 93.28% | ER Trees | 92.44% |
| Inf. Norm | 91.73% | SVM | 92.84% |
| Bray-Curtis [18] | 92.57% | Proposed | 93.61% |
| Cosine | 92.87% | | |

FIG. 2.8.3

TABLE IV
PERFORMANCE OF DIFFERENT TRAINING METHODS.

| Training Data | Feature Extractor | Accuracy |
|---|---|---|
| B | Frozen | 90.24% |
| B | Unfrozen | 90.96% |
| AB | Frozen | 92.56% |
| AB | Unfrozen | 93.61% |

FIG. 2.8.4

TABLE V
KNOWN MANIPULATIONS USED IN TRAINING AND UNKNOWN
MANIPULATIONS USED IN EVALUATION, WITH ASSOCIATED PARAMETERS

| Manipulation | Parameter | Value Range |
|---|---|---|
| Known Manipulations | | |
| Unaltered | — | — |
| Resizing (bilinear) | Scaling factor | $[0.6, 0.9] \cup [1.1, 1.9]$ |
| Gaussian blur (5×5) | $\sigma$ | $[1.0, 2.0]$ |
| Median blur | Kernel size | $\{3, 5, 7\}$ |
| AWG Noise | $\sigma$ | $[1.5, 2.5]$ |
| JPEG Compression | Quality factor | $\{50, 51, 52, \ldots, 95\}$ |
| Unsharp mask ($r = 2, t = 3$) | Percent | $[50, 300]$ |
| Adaptive Hist. Eq. | — | — |
| Unknown Manipulations | | |
| Wiener filter | Kernel size | $\{3, 5, 7\}$ |
| Web dithering | — | — |
| Salt + pepper noise | Percent | $\{5, 6, 7, \ldots, 20\}$ |

FIG. 2.8.5

TABLE VI
CORRECT CLASSIFICATION RATES FOR COMPARING MANIPULATION TYPE OF TWO IMAGE PATCHES, WITH KNOWN AND UNKNOWN MANIPULATIONS.

| | Known Manipulations | | | | | | | | Unknown Manipulations | | |
|---|---|---|---|---|---|---|---|---|---|---|---|
| Manip. Type | Orig. | Resize | Gauss. Blur | Med. Blur | AWGN | JPEG | Sharpen | Hist. Eq. | Wiener | Web Dither | Salt Pepper |
| Wiener | 1.00 | 0.94 | 0.03 | 0.87 | 1.00 | 1.00 | 1.00 | 1.00 | 0.96 | 1.00 | 1.00 |
| Web Dither | 0.95 | 1.00 | 1.00 | 1.00 | 0.88 | 1.00 | 0.86 | 0.92 | 1.00 | 1.00 | 0.02 |
| Salt Pepper | 0.94 | 1.00 | 1.00 | 1.00 | 0.99 | 1.00 | 0.93 | 0.95 | 1.00 | 0.02 | 1.00 |

FIG. 2.8.6

TABLE VII
RATES OF CORRECTLY IDENTIFYING A DATABASE AS "CONSISTENT" (I.E.
ALL THE SAME CAMERA MODEL) OR "INCONSISTENT," M=10, N=20

| threshold | Type 0 | Type 1 | Type 2 |
|---|---|---|---|
| 0.1 | 97.4% | 84.8% | 100% |
| 0.5 | 92.4% | 91.9% | 100% |
| 0.9 | 70.7% | 96.7% | 100% |

FIG. 2.8.7

LEARNED FORENSIC SOURCE SYSTEM FOR IDENTIFICATION OF IMAGE CAPTURE DEVICE MODELS AND FORENSIC SIMILARITY OF DIGITAL IMAGES

STATEMENT REGARDING GOVERNMENT SUPPORT

This invention was made with government support under Contract No. 1553610 awarded by the National Science Foundation. The government has certain rights in the invention.

BACKGROUND

Digital images are used in many scenarios, such as in news reporting, courts of law, government intelligence, as well as in communication on variety of social media platforms. Modern software, however, makes it easy for images to be manipulated or their source to be masked. For example, it is common that images downloaded from online databases, such as Facebook, have their source masked through metadata removal. To address this, researchers have developed a number of multimedia forensic techniques that are used to verify the source and authenticity of digital images.

One important multimedia forensics task is camera model identification, where the camera model that was used to capture an image is identified. A variety of techniques exist for camera model identification. These techniques employ a range of features including CFA demosaicing artifacts, sensor pattern noise, local binary patterns, noise models, and chromatic aberration. More recently, convolutional neural networks (CNNs) have been shown to be powerful tools for camera model identification. While these approaches for camera model identification are effective, a major drawback with many approaches is that they assume a closed set of camera models. That is they require prior knowledge, i.e. training data, from a source camera model in order to accurately identify images captured by that model. However, given the large number of camera models that exist, it is often unlikely that the camera model of an image under investigation exists within a training set. In many cases it is not feasible to scale an identification system to contain large numbers of training models.

Furthermore, in many scenarios an investigator may not be concerned with the exact camera model that was used to capture an image. Such scenarios include verifying whether a database of images were taken by the same camera model, discovery of intellectual property theft (e.g. unauthorized use of proprietary demosaicing strategies), or determining whether a splicing forgery has occurred within an image. When detecting splicing operations, camera model identification features can be used to detect when a spliced image is a composite of image content from two different camera models. Recent work by others shows that the outputs from a CNN-based camera model identification system can be iteratively clustered to detect and localize image splicing. They have found their method to be effective even when the spliced image does not contain content from camera models used to train the system.

Moreover, trustworthy multimedia content is important to a number of institutions in today's society, including news outlets, courts of law, police investigations, intelligence agencies, and social media websites. As a result, multimedia forensics approaches have been developed to expose tampered images, determine important information about the processing history of images, and identify details about the camera make, model, and device that captured them. These forensic approaches operate by detecting the visually imperceptible traces, or "fingerprints," that are intrinsically introduced by a particular processing operation.

Recently, researchers have developed deep learning methods that target digital image forensic tasks with high accuracy. For example, convolutional neural network (CNN) based systems have been proposed that accurately detect traces of median filtering, resizing, inpainting, multiple processing operations, processing order, and double JPEG compression. Additionally, researchers have proposed approaches to identify the source camera model of digital images and identify their origin social media website.

However, there are two main drawbacks to many of these existing approaches. First is that many deep learning systems assume a closed set of forensic traces, i.e. known and closed set of possible editing operations or camera models. That is, these methods require prior training examples from a particular forensic trace, such as the source camera model or editing operation, in order to identify it again in the future. This requirement is a significant problem for forensic analysts, since they are often presented with new or previously unseen forensic traces. Additionally, it is often not feasible to scale deep learning systems to contain the large numbers of classes that a forensic investigator may encounter. For example, systems that identify the source camera model of an image often require hundreds of scene-diverse images per camera model. To scale such a system to contain hundreds or thousands of camera models requires a prohibitively large data collection undertaking.

A second drawback of these existing approaches is that many forensic investigations do not require explicit identification of a particular forensic trace. For example when analyzing a splicing forgery, which is a composite of content from multiple images, it is often sufficient to simply detect a region of an image that was captured by a different source camera model, without explicitly identifying that source. That is, the investigator does not need to determine the exact processing applied to the image, or the true sources of the pasted content, just that an inconsistency exists within the image. In another example, when verifying the consistency of an image database, the investigator does not need to explicitly identify which camera models were used to capture the database, just that only one camera model or many camera models were used.

Recently, researchers have proposed CNN-based forensic systems for digital images that do not require a closed and known set of forensic traces. In particular, researchers proposed a system to output a binary decision indicating whether a particular image was captured by a camera model in a set of known camera models used for training, or from an unknown camera model that the classifier has not been trained to identify.

SUMMARY OF THE EMBODIMENTS

Information about an image's source camera model is important knowledge in many forensic investigations. In this paper the system(s) pro-pose a system that compares two image patches to determine if they were captured by the same camera model. To do this, the system(s) first train a CNN based feature extractor to output generic, high level features which encode information about the source camera model of an image patch. Then, the system(s) learn a similarity measure that maps pairs of these features to a score indicating whether the two image patches were captured by the same or different camera models. The system(s) show that the proposed system accurately determines if two patches were captured by the same or different camera models, even when the camera models are unknown to the investigator. The system(s) also demonstrate the utility of this approach for image splicing detection and localization.

BRIEF DESCRIPTION OF THE DRAWINGS

FIG. 1.1 shows a proposed system architecture.

FIG. 1.2 shows a source comparison accuracy where the triangular matrices show rates of correctly detecting two patches as sourced from different camera models. The columns labeled "Self" show rates of correctly detecting two patches as sourced from the same camera model. Results of the proposed method are on the left. On the right, the system(s) compare to an existing approach.

FIG. 1.3(a)-(d) shows splicing detection example with an (a) original and (b) spliced image. In (c) and (d), patches are highlighted that are found to have a different source than the reference patch outlined in a box.

FIG. 2.1 shows a forensic similarity system overview.

FIG. 2.2 shows the neural network architecture of the proposed forensic similarity system. The system is composed of a pair of CNN-based feature extractors, in a hard sharing (Siamese) configuration, which feed low-dimensional, high-level forensic feature vectors to the similarity network. The similarity network is a neural network that maps feature vectors from two image patches to a similarity score indicating whether they contain the same or different forensic traces.

FIG. 2.3 shows camera model correct comparison rates for 25 different camera models. Same camera model correct classification rates are on the diagonal, and different camera model correct classification rates are in the non-diagonal entries. Ten camera models were used in training, i.e. "Known" camera models, and 15 were not used in training, i.e. are "Unknown" with respect to the classifier. Color scales with classification rate.

FIG. 2.4 shows correct classification rates for comparing the resizing parameter in two image patches. Unknown scaling factors are {0.8, 1.2, 1.4}. Highlighting rectangles around data groups highlight one patch with unknown scaling factor, and darker highlight boxes show both patches that have unknown scaling factors.

FIG. 2.5(a)-(i) show splicing detection and localization example. The box outlines a reference patch. Patches, spanning the image with 50% overlap, that are detected as forensically different from the reference patch are highlighted in what appear to be light grey rectangles.

FIG. 2.6(a)-(c) show splicing detection and localization example. The light open box outlines a reference patch. Other patches, spanning the image with 50% overlap, that are detected as forensically different from the reference patch are highlighted.

FIG. 2.7(a)-(d) shows manipulation detection and localization example. The open box outlines a reference patch. Patches, spanning the image with 50% overlap, that are detected as forensically different from the reference patch are highlighted in the grey rectangles.

FIG. 2.8.1 shows Table I.
FIG. 2.8.2 shows Table II.
FIG. 2.8.3 shows Table III.
FIG. 2.8.4 shows Table IV.
FIG. 2.8.5 shows Table V.
FIG. 2.8.6 shows Table VI.
FIG. 2.8.7 shows Table VII.

DETAILED DESCRIPTION OF THE EMBODIMENTS

1. Learned Forensic Source Similarity for Unknown Camera Models

Information about an image's source camera model may be important knowledge in many forensic investigations. The system and method (referred to as the system(s) herein) propose a system that compares two image patches to determine if they were captured by the same camera model. To do this, the system(s) first train a CNN based feature extractor to output generic, high level features which encode information about the source camera model of an image patch. Then, the system(s) learn a similarity measure that maps pairs of these features to a score indicating whether the two image patches were captured by the same or different camera models. The system(s) show that the proposed system accurately determines if two patches were captured by the same or different camera models, even when the camera models are unknown to the investigator. The system(s) also demonstrate the utility of this approach for image splicing detection and localization.

1.1 Introduction

The system herein may determines if two image patches are captured by different camera models or from the same camera model. The approach is different from camera model identification in that it does not determine the exact camera model that was used to capture either patch. The power of the proposed approach is that it is able to compare camera models that were not used to train the system. This allows an investigator to learn important information about images captured by any camera and isn't limited by the set of camera models in the investigator's database.

To accomplish this, the system develops a measure that describes the similarity between the camera models that were used to capture two image patches. The systems do this by first learning a CNN-based feature extractor that outputs generic, high level features useful for camera model identification. Then, the systems train a similarity network that maps pairings of these features to a score that indicates whether the two image patches were captured by the same camera model or two different camera models. The systems experimentally show that the proposed approach effectively differentiates between camera models, even if the source camera models were not used to train the system. Additionally, the systems show an example that demonstrates the promise of this approach for detecting an localizing image splicing manipulations.

1.2 Problem Formulation & System Overview

There are many scenarios where an investigator may wish to know information about the source camera model of an image, but may not have sufficient training data to identify the true source. To address this, the method compares two image patches, and renders a decision about whether the source camera models of these patches are the same or different. This comparison is performed without needing training information from the source camera model of either patch. This approach provides less information about the true camera model than a camera model identification method, but it allows an investigator to gain important information about images that are sourced from any camera model, not just those belonging to an investigator's training set.

An investigator may have access to a set of camera models, referred to as known camera models, from which they can gather training images. The investigator may be presented with images sourced from camera models that do not belong to this set, referred to as unknown camera models. As a result, it is important that the proposed system be able to learn a similarity measure from images belonging to known camera models, and also effectively compare images belonging to unknown camera models.

The approach compares two image patches and determines whether the source camera models are different or the same. To do this, the system develops a comparison function C: X×X→{0, 1}, where X is the space of image patches. The mapping is such that for two inputs $X_1 \in X$, $X_2 \in X$, the comparison function may map to either 0 or 1. An output of 0 indicates that the source camera models of the two image patches are different, and an output of 1 indicates that the source camera model is the same, i.e.

$$C(X_1, X_2) = \begin{cases} 0 & \text{if } X_1, X_2 \text{ from different camera models,} \\ 1 & \text{if } X_1, X_2 \text{ from same camera model.} \end{cases} \quad (EQ.\ 1.1)$$

This problem may be tackled in three steps. First, a feature extractor function f: $X \to R^N$ is learned that maps an input image patch $X \in X$ to an N-dimensional feature space, which encodes high level camera model information. Next, a feature similarity measure S: $R^N \times R^N \to [0, 1]$ is learned that maps pairs of features to a space bounded by 0 and 1, with 0 indicating that the source camera models are dissimilar and 1 indicating that they are similar. Finally, this measure is compared to a threshold η to decide whether the source camera models are the same or different.

The overall system, $$C(X_1, X_2) = \begin{cases} 0 & \text{if } S(f(X_1), f(X_2)) \leq \eta \\ 1 & \text{if } S(f(X_1), f(X_2)) > \eta \end{cases}, \quad (EQ.\ 1.2)$$

is a combination of these three steps. The system inputs two image patches and maps each to a feature space that encodes high-level camera model information. Then, the pair of features are mapped to an output score indicating the similarity of their source camera models which is finally compared to a threshold.

1.3 Proposed Approach

To create the proposed system, the system(s) may first train a convolutional neural network (CNN) to learn a feature extractor that produces generic, high-level features from image patches that are useful for camera model identification. These features may be related to components of the image capturing pipeline that uniquely identify different camera models. Then, a similarity network is trained using pairs of these features to learn a similarity measure. The similarity network is a multilayer neural network that first maps the extracted features to a new feature space. It then compares the newly mapped features to each other to finally render a decision on whether the two input image patches are sourced from the same or different camera models. A view of the overall network architecture is shown in FIG. 1.1.

The whole system may be learned in two phases. In the first learning phase, called Learning Phase A, the feature-extractor network is trained to identify a set of camera models A. Then, during the second learning phase, called Learning Phase B, the similarity network is trained to learn similarity between pairs of high-level features extracted from a second set of camera model B. The camera model sets A and B are disjoint to ensure that the similarity network learns to differentiate camera models that have not been learned by the feature extractor, including unknown camera models.

1.3.1 Feature Extractor Learning Phase A

The first step in the approach is to learn an extractor for generic, high-level features that encode camera model information. To do this, the system(s) train a convolutional neural network (CNN) to identify camera models from image patches. This training is called Learning Phase A. After training, a feature representation f(X) of an image patch is extracted by feeding forward the patch X through the network, then extracting the neuron values, pre-activation, of a high-level fully connected layer. The feature representation f(X) corresponds to a generic, high-level encoding of the patch's source camera model.

The feature extractor network, depicted on the left in FIG. 1.1, contains a constrained convolutional layer followed by four convolutional layers, labeled conv1-4. Each of the four non-constrained layers is composed of batch normalization, hyberbolic tangent activation function, and pooling steps. The constrained convolutional layer may contain 3 kernels each of size 5×5. A constraint is placed on weights w for each kernel in the constrained layer such that $$\begin{cases} w(0, 0) = -1 \\ \sum_{(l,m) \neq (0,0)} w(l, m) = 1 \end{cases} \quad (EQ.\ 1.3)$$

That is, the constrained layer has kernels where the central value is −1, and the rest of the weights sum to 1. This constrained convolutional layer roughly corresponds to a prediction error filter, which jointly suppresses image content while allowing the network to learn camera model related pixel value dependencies introduced by the camera's image processing pipeline. Details of the exact parameters of this network may be found in other art.

Following the convolutional layers are a series of 2 fully-connected neuron layers, each with 200 neurons that have hyberbolic tangent activation. These fully connected layers are labeled fc_a1 and fc_a2 in FIG. 1.1. A final fully-connected layer with neurons and a softmax is used to identify the input camera model, where is the number of camera models in the training camera model set. To extract features f(X) from an image patch X, the system(s) feed X forward through the trained network and record the neuron values, preactivation, of layer fc_a2. The feature vector f(X) has dimension 200 and encodes information about the source camera model of X.

1.3.2 Similarity Network Learning Phase B

The second step of the approach is to map pairings of the extracted features to a similarity score that indicates whether a pair of input image patches are sourced from different camera models or the same model. To do this, the system(s) train a multilayer neural network to compare pairs of features that are extracted from the feature extractor described in Sec. 1.3.1. The system(s) call this network a similarity network. The construction of this network is modeled after image comparison neural networks called "Siamese" networks in the prior art.

The architecture for this similarity network is depicted in FIG. 1.1 on the right. To start, the system(s) take two copies the pre-trained feature extractor network learned in Learning Phase A. The extracted features f(X1) and f(X2) from two image patches are used as inputs to the similarity network. The features f(X1) and f(X2) are separately connected to two layers fc b1 and fc b2. Both layers contain 1024 neurons with a parametric ReLU activation function. These layers learn to map the input features to a new feature space. During training, the weights are shared between fc_b1 and fc_b2.

Then, layers fc_b1 and fc_b2 may be both fully connected to a single layer of neurons, labeled fc_b3 in FIG. 1.1. This layer may contain 64 neurons, each with parametric ReLU activation. This layer of neurons is then fully connected to a single neuron with sigmoid activation. The activation value of this neuron corresponds to the similarity value S(f(X1),f(X2)) in Eq. (1.2). An activation value above a threshold $\eta=0.5$ indicates that the pair of input patches X1 and X2 are captured by the same camera model.

During Learning Phase B, the similarity network is trained using pairs of image patches with labels that correspond to whether the patches were captured by different camera models (0) or the same camera model (1). To ensure that the similarity network learns to compare camera models that are unknown, the set of camera models used in Learning Phase B is disjoint to the set of camera models used in Learning Phase A. Training is performed through iterative back propagation with binary cross entropy loss. During training, the weights of the feature extractor network are frozen, and only weights in the similarity network are learned. Additionally, 50% dropout is used on the output of layers fc b1 and fc b2 to help prevent overfitting. Together, the feature extractor and similarity network form a full system, which inputs two patches and outputs a decision on whether they are captured by the same or different camera models.

Additionally, to make a decision on an image patch the system(s) require that it have an entropy value above a certain threshold. This is done to ensure that each patch contains sufficient texture information to effectively encode its source camera model. Entropy h is defined by $$h=-\Sigma_{k=0}^{255} p_k \ln(p_k). \quad \text{(EQ. 1.3.1)}$$

where pk is the proportion of pixels in the patch that are of value k. Here, entropy is measured in nats.

3.4 Experimental Results

To assess the efficacy of the approach, the inventors conducted two experiments that test the system under various investigation scenarios. To do this, the experiment started with a database of images from 65 camera models, of which 20 are from the publicly available Dresden Image Database. The remaining 45 camera models are from the own database composed of point-and-shoot, cellphone, and DSLR cameras. For each camera model in the database, the system(s) collected 300 images with diverse and varied scene content. The set of all camera models were split into 3 disjoint sets; 40 camera models were placed into 3 disjoint sets; 40 camera models were placed in set A, 20 different models in set B, and the remaining 5 in set C.

The feature extractor network was trained (Learning Phase A) using image patches from camera models in A. For each camera model the system(s) used 50,000 unique non-overlapping patches of size 256×256, with locations chosen at random, yielding 2,000,000 total training patches. Only the green color channel was used. The network was trained using stochastic gradient descent for 30 epochs, with an initial learning rate of 0.001 decreased by a factor of 2 every 3 epochs, decay of 0.0005, and momentum of 0.9. Training of the feature extractor was performed using Caffe on a GTX 1080TI GPU. Next, the similarity network was trained (Learning Phase B), using features extracted from image patches sourced from camera models in A. For each camera model, the system(s) used 20,000 unique nonoverlapping patches, chosen at random, to extract features yielding a total of 400,000 training patches. As described in Sec. 1.3.2, only features from image patches whose entropy was greater than 4 nats were used. A training set was made composed of 250,000 random pairings of features from different camera models and 250,000 random pairings of features from the same camera model. The similarity network was trained using the Adam optimizer [25] for 60 epochs, with a learning rate of 0.0005, B1=0.9, B2=0.99, and $\in=10^{-6}$. Training was performed using Keras with a Tensorflow backend on a GTX 1080TI GPU.

1.4.1 Source Identification

In the first experiment, the inventors assessed the performance of the system in determining whether two image patches were captured by different or the same camera models. The inventors did this using three scenarios:

1) both patches captured by camera models known to the investigator, 2) one patch captured by a known camera model and the other by an unknown camera model, and 3) both patches captured by unknown camera models. These scenarios represent all scenarios that an investigator may encounter.

To do this, the inventors started with 10,000 unique patches each from 10 different camera models, yielding 100,000 total patches. Five of the camera models were known camera models in A, and the other five were the unknown camera models in C. The patches were randomly paired and then tested by the proposed comparison system. As described in Sec. 1.3.2, only image patches whose entropy was greater than 4 nats were used.

The results of this experiment are shown in FIG. 1.2. The triangular matrices show rates of correctly detecting two patches as captured by different camera models. The columns labeled "Self" show rates of correctly detecting two patches as sourced from the same camera model. For example, when one patch is captured by a Sony DSC-H300 and the other by an LG G3, the proposed approach correctly detects the camera models as different at a rate of 98%. When both patches are captured by a Samsung Galaxy S4, the proposed approach correctly detects patch sources as the same at a rate of 99%. The overall accuracy achieved by the method was 91.1%. In scenarios where both source camera models were known, the system achieved 95.8% accuracy. In scenarios where both source camera models were unknown, the proposed system achieved 90.6% accuracy. In the scenarios where one camera model was known and the other unknown, the system achieved 84.0% accuracy. However, in these scenarios a few particular cases, such as the Canon SX42015 versus Canon SX630HS, greatly reduced the detection accuracy. Most unknown versus known cases were correctly detected at a rate of 99% or greater. The results of this experiment demonstrate that the proposed system accurately determines meaningful information about the source camera models of two patches, even if one or both of the camera models are unknown.

There were a few cases that were difficult for the proposed approach to detect. These instances typically occurred when the two camera models were produced by same manufacturer, or when both of the camera models were a cellphone or DSLR. The latter illustrates the need for a diverse training set, since the known database is primarily composed of point-and-shoot camera models.

In addition, the experiment compared to an approach adapted from other researches Bondi et. al. Briefly, their method detects and localizes image splicing by iteratively clustering image patches into either original or forged sets. As part of their algorithm, they calculate the Bray-Curtis distance between the softmax scores of patches as output by a camera model identification CNN. This distance is used to determine set membership (i.e. original or forged content). The inventors tested the efficacy of using this distance to compare the source of two image patches.

To compare to their approach, the experiment first used their pre-trained convolutional neural network to output the softmax scores of image patches. Then, the inventors calculated the Bray-Curtis distance between pairs of these scores, and used a threshold to detect whether the camera models were the same or different. Since all camera models in this experiment were unknown with respect to the Bondi et al. CNN (with the exception of Sony DSC-T77), the experiment compared only to the unknown cases. The inventors set the decision threshold so that the false alarm rate is equal to the false alarm rate of the unknown cases in the system (4.5%), to make a fair comparison.

In all cases the proposed method outperformed the method the system(s) adapted from Bondi et al, except when one patch was sourced by a Sony DSC-T77 and the other a Pentax K-7 camera. This shows that the proposed system more accurately compares the camera model source of image patches. The inventors note that the Sony DSC-T77 is known relative to the Bondi et al. neural network yet is unknown to the system.

1.4.2 Splicing Detection

An investigator may also be concerned with whether an image is a spliced forgery. In this experiment, the inventors demonstrate the promise of the proposed approach for detecting spliced images that are a composite of content from two different camera models. To do this, they took a spliced image and split it into 256×256 patches with 50% overlap. The system(s) selected one patch as a reference, computed its comparison score to every other patch in the image, and then highlighted all of the patches that were detected as captured by a different source.

An example of this analysis is shown in FIGS. 1.3(a)-1.3(d) on an image downloaded from an online forum. The original and spliced images are shown in 1.3(a) and 1.3(b). In 1.3(c) the system 1.3(s) selected a patch in the original part of the image as reference, and the method highlighted the foreign portion of the image a having a different source. In 1.3(d) the system(s) selected a patch in the foreign part of the image as reference, and the method highlighted the original parts of the image as having a different source. The results of this experiment demonstrate the promise of the proposed approach at detecting and localizing spliced images.

2. Forensic Similarity for Digital Images
2.1 Introduction

The inventors propose a new digital image forensics approach that operates on an open set of forensic traces. This approach, which the inventors call forensic similarity, determines whether two image patches contain the same or different forensic traces. This approach is different from other forensics approaches in that it does not explicitly identify the particular forensic traces contained in an image patch, just whether they are consistent across two image patches. The benefit of this approach is that prior knowledge of a particular forensic trace is not required to make a similarity decision on it.

To do this, the inventors propose a two-part deep learning system. In the first part, called the feature extractor, the system(s) use a CNN to extract general low-dimensional forensic features, called deep features, from an image patch. Prior research has shown that CNNs can be trained to map image patches onto a low dimensional feature space that encodes general and high-level forensic information about that patch. Next, the system(s) use a three-layer neural network to map pairs of these deep features onto a similarity score, which indicates whether the two image patches contain the same forensic trace or different forensic traces.

The inventors evaluated the ability of the proposed forensic similarity system at determining whether two image patches were 1) captured by the same or different camera model, 2) manipulated the same or different editing operation, and 3) manipulated same or different manipulation parameter, given a particular editing operation. Importantly, the inventors evaluated performance on camera models, manipulations and manipulation parameters not used during training, demonstrating that this approach is effective in open-set scenarios.

Furthermore, the inventors demonstrated the utility of this approach in two practical applications that a forensic analyst may encounter. In the first application, the inventors demonstrate that the forensic similarity system detects and localizes image forgeries. Since image forgeries are often a composite of content captured by two camera models, these forgeries are exposed by detecting the image regions that are forensically dissimilar to the host image. In the second application, the inventors show that the forensic similarity system verifies whether a database of images was captured by all the same camera model, or by different camera models. This is useful for flagging social media accounts that violate copyright protections by stealing content, often from many different sources.

In the previous work above, sometimes referred to herein as prior work or art, though this is not meant to be a legal definition thereof but just a notation that it came before, the earlier system (above) proposed a proof-of-concept similarity system for comparing the source camera model of two image patches, and evaluated on a limited set of camera models. In this section, the inventors extend that in several ways. First, the inventors reframe the approach as a general system that is applicable to any measurable forensic trace, such as manipulation type or editing parameter, not just source camera model. Second, the inventors significantly improve the system architecture and training procedure, which led to an over 50% reduction in classification error. Finally, the inventors experimentally evaluate this approach in an expanded range of scenarios, and demonstrate utility in two practical applications.

2.2 Forensic Similarity

Prior multimedia forensics approaches for digital images have focused on identifying or classifying a particular forensic trace (e.g. source camera model, processing history) in an image or image patch. These approaches, however, suffer from two major drawbacks in that 1) training samples from a particular trace are required to identify it, and 2) not all forensic analyses require identification of a trace. For example, to expose a splicing forgery it is sufficient to identify that the forged image is simply composite content from different sources, without needing to explicitly identify those sources. The system(s) herein proposes a new general approach that addresses these drawbacks. Herein, we call this approach forensic similarity. Forensic similarity is an approach that determines if two image patches have the same or different forensic trace. Unlike prior forensic approaches, it does not identify a particular trace, but still provides important forensic information to an investigator. The main benefit of this type of approach is that it is able to be practically implemented in open-set scenarios. That is, a forensic similarity-based system does not inherently require training samples from a forensic trace in order to make a forensic similarity decision. Later, in Sec. 2.3, the system(s) describe how this approach is implemented using a CNN-based deep learning system.

In this work, the system(s) may define a forensic trace to be a signal embedded in an image that is induced by, and captures information about, a particular signal processing operation performed on it. Forensic traces may be inherently unrelated to the perceptual content of the image; two images depicting different scenes may contain similar forensic traces, and two images depicting similar scenes may contain different forensic traces. Common mechanisms that induce a forensic trace an image are: the camera model that captured the image, the social media website where the image was downloaded from, and the processing history of the image. A number of approaches have been researched to extract and identify the forensic traces related to these mechanisms.

These prior approaches, however, assume a closed set of forensic traces. They are designed to perform a mapping X→Y where X is the space of image patches and Y is the space of known forensic traces that are used to train the system, e.g. camera models or editing operations. When an input image patch has a forensic trace y/∈Y, the identification system is still forced to map to the space Y, leading to erroneous an result. That is, the system will misclassify this new "unknown" trace as a "known" one in Y.

This may problematic since in practice forensic investigators are often presented with images or image patches that contain a forensic trace for which the investigator does not have training examples. The system(s) call these unknown forensic traces. This may be a camera model that does not exist in the investigator's database, or previously unknown editing operation. In these scenarios, it is still important to glean important forensic about the image or image patch.

To address this, the inventors propose a system that is capable of operating on unknown forensic traces. Instead of building a system to identify a particular forensic trace, the system(s) ask the question "do these two image patches contain the same forensic trace?" Even though the forensic similarity system may have never seen a particular forensic trace before, it is still able to distinguish whether they are the same or different across two patches. This type of question is analogous to the content-based image retrieval problem, and the speaker verification problem.

We define forensic similarity as the function $$C: \mathbb{X} \times \mathbb{X} \to \{0,1\} \tag{EQ. 2.1}$$

that compares two image patches in a computer-based comparator. This is done by mapping two input image patches X1, X2∈X to a score indicating whether the two image patches have the same or different forensic trace. A score of 0 indicates the two image patches contain different forensic traces, and a score of 1 indicates they contain the same forensic trace. In other words $$C(X_1, X_2) = \begin{cases} 0 & \text{if } X_1, X_2 \text{ diff. forensic traces,} \\ 1 & \text{if } X_1, X_2 \text{ same forensic trace.} \end{cases} \tag{EQ. 2.2}$$

To construct this system, the inventors propose a forensic similarity system including of two conceptual parts, which are shown in the system overview in FIG. 2.1. The first conceptual part is called the feature extractor $$f: \mathbb{X} \to \mathbb{R}^N, \tag{EQ 2.3}$$

that maps an input image X to a real valued N-dimensional feature space. This feature space encodes high-level forensic information about the image patch X. Recent research in multimedia forensics has shown that convolutional neural networks (CNNs) are powerful tools for extracting general, high-level forensic information from image patches. Section 2.3 describes the proposed implementation of the forensic similarity system.

Next the system(s) define the second conceptual part, the similarity function $$S: \mathbb{R}^N \times \mathbb{R}^N \to [0,1] \tag{EQ. 2.4}$$

that maps pairs of forensic feature vectors to a similarity score that takes values from 0 to 1. A low similarity score indicates that the two image patches X1 and X2 have dissimilar forensic traces, and a similarity score indicates that the two forensic traces are highly similar.

Finally, the system(s) compare the similarity score S(f(X1), f(X2)) of two image patches X1 and X2 to a threshold η such that $$C(X_1, X_2) = \begin{cases} 0 & \text{if } S(f(X_1), f(X_2)) \le \eta \\ 1 & \text{if } S(f(X_1), f(X_2)) > \eta \end{cases}. \tag{EQ. 2.5}$$

In other words, the proposed forensic similarity system takes two image patches X1 and X2 as input. A feature extractor f(X1) and f(X2), which encode high-level forensic information about the image patches. Then, a similarity function maps these two feature vectors to a similarity score, which is then compared to a threshold. A similarity score above the threshold indicates that X1 and X2 have the same forensic trace (e.g. processing history or source camera model), and a similarity score below the threshold indicates that they have different forensic traces.

2.3 Proposed Approach

In this section, the system(s) describe the proposed deep learning system architecture and associated training procedure for forensic similarity. In the proposed forensic similarity architecture and training procedure, the system(s) build upon successful CNN-based techniques used in multimedia forensics literature, as well as propose a number of innovations that are aimed at extracting robust forensic features from images and accurately determining forensic similarity between two image patches.

The proposed forensic similarity system includes at least two elements: 1) a CNN-based feature extractor that maps an input image onto a low-dimensional feature space that encodes high level forensic information, and 2) a three-layer neural network that we call the similarity network, that maps pairs of these features to a score indicating whether two image patches contain the same forensic trace. This system is trained in two successive phases. In the first phase, called Learning Phase A, the system(s) train the feature extractor. In the second phase, called Learning Phase B the system(s) train the similarity network. Finally, in this section the system(s) describe an entropy-based method of patch selection, which the system(s) use to filter out patches that are not suitable for forensic analysis.

2.3.A Learning Phase A—Feature Extractor

Here we describe the deep-learning architecture and training procedure of the feature extractor that maps an input image patch onto a low dimensional feature space, which encodes forensic information about the patch. Later, pairs these feature vectors are used as input to the similarity network described below in Sec. 2.3.B. Developments in machine learning research have shown that CNNs are powerful tools to use as generic feature extractors. This is done by robustly training a deep convolutional neural network for a particular task, and then using the neuron activations, at a deep layer in the network, as a feature representation of an image. These neuron activations are called "deep features," and are often extracted from the last fully connected layer of a network. Research has shown that deep features extracted from a CNN trained for object recognition tasks can be used to perform scene recognition tasks and remote sensing tasks.

In multimedia forensics research, it has been shown that deep features based approaches also very powerful for digital image forensics tasks. For example, certain prior art showed that deep features from a network trained on one set of camera models can be used to train an support vector machine to identify a different set of camera models, and other prior art showed that deep features from a CNN trained on a set of camera models can be used to determine whether the camera model of the input image model was used to train the system. Furthermore, it has been shown that deep features from a CNN trained for camera model identification transfer very well to other forensic tasks such manipulation detection, suggesting that deep features related to digital forensics are general to a variety of forensics tasks.

(1) Architecture: To build a forensic feature extractor, the system(s) uses the MISLnet CNN architecture. Briefly, this CNN includes 5 convolutional blocks, labeled 'conv1' through 'conv5' in FIG. 2.2 and two fully connected layers labeled 'fc1' and 'fc2'. Each convolutional block, with the exception of the first, contains a convolutional layer followed by batch normalization, activation, and finally a pooling operation. The two fully connected layers, labeled 'fc1' and 'fc2,' each include 200 neurons with hyperbolic tangent activation.

To use this CNN as a deep feature extractor, an image patch is fed forward through the (trained) CNN. Then, the activated neuron values in the last fully connected layer, 'fc2' in FIG. 2.2, are recorded. These recorded neuron values are then used as a feature vector that represents high-level forensic information about the image. The extraction of deep-features from a image patch is the mapping in (3), where the feature dimension N=200 corresponding to the number of neurons in 'fc2.'

The architecture of this CNN-based feature extractor is similar to the architecture the system(s) used in certain earlier art, however, in this system, the inventors alter the CNN architecture in at least three ways to improve the robustness of the feature extractor. First, the system(s) use full color image patches in RGB as input to the network, instead of just the green color channel used previously. Since many forensic features are expressed across different color channels, the network may learn these feature representations. This is done by modifying each 5×5 convolutional kernel to be of dimension 5×5×3, where the last dimension corresponds to image's the color channel. Second, the system(s) relax the constraint imposed on the first convolutional layer that is used to encourage the network to learn prediction error residuals.

While this constraint is useful for forensics tasks of single channel image patches, it is not immediately translatable to color images. Third, the system(s) double the number of kernels in the first convolutional layer from 3 to 6, to increase the expressive power of the network.

The feature extractor architecture is depicted by each of the two identical 'Feature Extractor' blocks in FIG. 2. In the proposed system, inventors use two identical feature extractors, in 'Siamese' configuration, to map two input image patches X1 and X2 to a feature space f(X1) and f(X2).

This configuration ensures that the system is symmetric, i.e. The ordering of X1 and X2 does not matter. The inventors refer to the Siamese feature extractor blocks as using hard sharing, meaning that the exact same weights and biases are shared between the two blocks.

(2) Training Methodology: In the proposed approach the system(s) first train the feature extractor during Learning Phase A. To do this, the system(s) add an additional fully-connected layer with softmax activation to the feature extractor architecture. The system(s) provide the feature extractor with image patches and labels associated with the forensic trace of each image patch. Then, the system(s) iteratively train the network using stochastic gradient descent with a cross-entropy loss function. Training is performed for 30 epochs with an initial learning rate of 0.001, which is halved every three epochs, and a batch size of 50 image patches.

During Learning Phase A, the system(s) train the feature extractor network on a closed set of forensic traces referred to as "known forensic traces" because training a CNN in this way yields deep-feature representations that are general to other forensic tasks. In particular, it was shown that when a feature extractor was trained for camera model identification, it was transferable to other forensic tasks. Because of this, during Learning Phase A, the system(s) train the feature extractor on a large set of image patches with labels associated with their source camera model.

In this way, the system(s) train two versions of the feature extractor network: one feature extractor that uses 256×256 image patches as input and another that uses 128×128 image patches as input. The system(s) note that to decrease the patch size further would require substantial architecture changes due to the pooling layers. In each case, the system(s) train the network using 2,000,000 image patches from the 50 camera models in the "Camera model set A" found in Table I, FIG. 2.8.1.

The feature extractor is then updated again in Learning Phase B, as described below in Sec. 2.3.B. This is significantly different than in earlier work], where the feature extractor remains frozen after Learning Phase A. In the experimental evaluation in Sec. 2.4.A, the system(s) show that allowing the feature extractor network to update during Learning Phase B significantly improves system performance.

2.3.B Learning Phase B Similarity Network

The proposed neural network architecture may map a pair of forensic feature vectors f(X1) and f(X2) to a similarity score∈[0, 1] as described in EQ 2.4. The similarity score, when compared to a threshold, indicates whether the pair of image patches X1 and X2 have the same or different forensic traces. We call this proposed neural network the similarity network, and is depicted in the right-hand side of FIG. 2.2. Briefly, the network includes 3 layers of neurons, which the system(s) view as a hierarchical mapping of two input features vectors to successive feature spaces and ultimately an output score indicating forensic similarity.

1) Architecture: The first layer of neurons, labeled by 'fcA' in FIG. 2.2, contains 2048 neurons with ReLU activation. This layer maps an input feature vector f(X) to a new, intermediate feature space $f_{inter}(X)$. The system(s) use two identical 'fcA' layers, in Siamese (hard sharing) configuration, to map each of the input vectors $f(X1)$ and $f(X2)$ into $f_{inter}(X1)$ and $f_{inter}(X2)$.

This mapping for the kth value of the intermediate feature vector is calculated by an artificial neuron function $$f_{k,inter}(X) = \phi\left(\sum_{i=0}^{N} w_{k,i} f_i(X) + b_k\right), \quad \text{(EQ. 2.6)}$$

which is the weighted summation, with weights $w_{k,0}$ through $w_{k,N}$, of the N=200 elements in the deep-feature vector $f(X)$, bias term bk and subsequent activation by ReLU function $\varphi(\bullet)$. The weights and bias for each element of $f_{inter}(X)$ are arrived at through stochastic gradient descent optimization as described below.

Next the second layer of neurons, labeled by 'fcB' in FIG. 2.2, contains 64 neurons with ReLU activation. As input to this layer, the system(s) create a vector $$f_{concat}(X_1, X_2) = \begin{bmatrix} f_{inter}(X_1) \\ f_{inter}(X_2) \\ f_{inter}(X_1) \odot f_{inter}(X_2) \end{bmatrix}, \quad \text{(EQ. 2.7)}$$

that is the concatenation of $f_{inter}(X1)$ $f_{inter}(X2)$ and $f_{inter}(X1)$ ($\bullet$) $f_{inter}(X2)$, where ($\bullet$) is the element-wise product operation. This layer maps the input vector $f_{concat}(X1, X2)$ to a new 'similarity' feature space $f_{sim}(X1, X2)$ $R^{64}$ using the artificial neuron mapping described in (6). This similarity feature space encodes information about the relative forensic information between patches X1 and X2.

Finally, a single neuron with sigmoid activation maps the similarity vector $f_{sim}(X1, X2)$ to a single score. We call this neuron the 'similarity neuron,' since it outputs a single score 2 [0, 1], where a small value indicates X1 and X2 contain different forensic traces, and larger values indicate they contain the same forensic trace. To make a decision, the system(s) compare the similarity score to a threshold $\eta$ typically set to 0.5.

The proposed similarity network architecture increases the number of neurons in 'fcA' from 1024 to 2048 over the earlier approach, and the system(s) add to the concatenation vector the elementwise multiplication of $f_{inter}(X1)$ and $f_{inter}(X2)$. The element-wise product of feature vectors are powerful for speaker verification tasks in machine learning systems. These additions increase the expressive power of the similarity network, and as a result improve system performance.

2) Training Methodology: Here, the system(s) describe the second step of the forensic similarity system training procedure, called Learning Phase B. In this learning phase, the system(s) train the similarity network to learn a forensic similarity mapping for any type of measurable forensic trace, such as whether two image patches were captured by the same or different camera model, or manipulated by the same or different editing operation. The system(s) control which forensic traces are targeted by the system with the choice of training sample and labels provided during training.

Notably, during Learning Phase B, the system(s) allow the error to back propagate through the feature extractor and update the feature extractor weights. This allows the feature extractor to learn better feature representations associated with the type of forensic trace targeted in this learning phase. Allowing the feature extractor to update during Learning Phase B significantly differs from the implementation earlier, which used a frozen feature extractor.

The inventors train the similarity network (and update the feature extractor simultaneously) using stochastic gradient descent for 30 epochs, with an initial learning rate of 0.005 which is halved every three epochs. The descriptions of training samples and associated labels used in learning Phase B are described in Sec. 2.4, where the system(s) investigate efficacy on different types of forensic traces.

2.3.C Patch Selection

Some image patches may not contain sufficient information to be reliably analyzed for forensics purposes. Here, a method for selecting image patches that are appropriate for forensic analysis was used. In this paper the system(s) use an entropy-based selection method to filter out pairs of image patches prior to analyzing their forensic similarity. This filter is employed during evaluation only and not while training.

To do this, the system(s) views a forensic trace as an amount of information encoded in an image that has been induced by some processing operation. An image patch is a channel that contains this information. From this channel the system(s) extract forensic information, via the feature extractor, and then compare pairs of these features using the similarity network. Consequently, an image patch must have sufficient capacity in order to encode forensic information.

When evaluating pairs of image patches, the system(s) ensure that both patches have sufficient capacity to encode a forensic trace by measuring their entropy. Here, entropy h is defined as $$h = -\sum_{k=0}^{255} p_k \ln(p_k), \quad \text{(EQ. 2.8)}$$

where pk is the probability that a pixel has luminance value k in the image patch. Entropy h is measured in nats. The system(s) estimate pk by measuring the proportion of pixels in an image patch that have luminance value k.

When evaluating image patches, the system(s) ensure that both image patches have entropy between 1.8 and 5.2 nats. The system(s) chose these values since 95% of image patches in the database fall within this range. Intuitively, the minimum threshold for the patch selection method eliminates flat (e.g. saturated) image patches, which would appear the same regardless of camera model or processing history. This method also removes patches with very high entropy. In this case, there is high pixel value variation in the image that may obfuscate the forensic trace.

2.4 Experimental Evaluation

The inventors conducted a series of experiments to test the efficacy of the proposed forensic similarity system in different scenarios. In these experiments, the system(s) tested the system accuracy in determining whether two image patches were 1) captured by the same or different camera model, 2) manipulated by the same or different editing operation, and 3) manipulated by the same or different manipulation parameter, given a particular editing operation. These scenarios were chosen for their variety in types of forensic traces and because those traces are targeted in forensic investigations. Additionally, the system(s) conducted experiments that examined properties of the forensic similarity system, including: the effects of patch size and post-compression, comparison to other similarity measures, and the impact of network design and training procedure choices.

The results of these experiments show that the proposed forensic similarity system is highly accurate for comparing a variety of types of forensic traces across two image patches. Importantly, these experiments show this system is accurate even on "unknown" forensic traces that were not used to train the system. Furthermore, the experiments show that the proposed system significantly improves upon prior art, reducing error rates by over 50%.

To do this, the system(s) started with a database of 47,785 images collected from 95 different camera models, which are listed in Table I (FIG. 8.1). Images from 26 camera models were collected as part of the Dresden Image Database "Natural images" dataset. The remaining 69 camera models were from the own database composed of point-and-shoot, cellphone, and DSLR cameras from which the system(s) collected at minimum 300 images with diverse and varied scene content. The camera models were split into three disjoint sets, A, B, and C. Images from A were used to train the feature extractor in Learning Phase A, images from A and B were used to train the similarity network in Learning Phase B, and images from C were used for evaluation only. First, set A was selected by randomly selecting 50 camera models from among those for which there were at least 40,000 non-overlapping 256×256 patches were available. Next, camera model set B was selected by randomly choosing 30 camera models, from among the remaining, which contained had least 25,000 total non-overlapping 256×256 patches. Finally, the remaining 15 camera models were assigned to C.

In all experiments, the system(s) started with a pre-trained feature extractor that was trained from 2,000,000 randomly chosen image patches from camera models in A (40,000 patches per model) with labels corresponding to their camera model, as described in Sec. 2.3. For all experiments, the system(s) started with this feature extractor since research showed that deep features related to camera model identification are a good starting point for extracting other types of forensic information.

Next, in each experiment the system(s) conducted Learning Phase B to target a specific type of forensic trace. To do this, the system(s) created a training dataset of pairs of image patches. These pairs were selected by randomly choosing 400,000 image patches of size 256×256 from images in camera model sets A and B, with 50% of patch pairs chosen from the same camera model, and 50% from different camera models. For experiments where the source camera model was compared, a label of 0 or 1 was assigned to each pair corresponding to whether they were captured by different or the same camera model. For experiments where the system(s) compared the manipulation type or manipulation parameter, these image patches were then further manipulated (as described in each experiment below) and a label assigned indicating the same or different manipulation type/parameter. Training was performed using Tensorflow v1.10.0 with a Nvidia GTX 1080 Ti.1

To evaluate system performance, the system(s) created an evaluation dataset of 1,200,000 pairs of image patches, which were selected by randomly choosing 256×256 image patches from the 15 camera models in set C ("unknown" camera models not used in training). The system(s) also included image patches from 10 camera models randomly chosen from set A. One device from each of these 10 "known" camera models was withheld from training, and only images from these devices were used in this evaluation dataset. For experiments where the system(s) compared the manipulation type or manipulation parameter, the pairs of image patches in the evaluation dataset were then further manipulated (as described in each experiment below) and assigned a label indicating the same or different manipulation type/parameter.

2.4.A Source Camera Model Comparison

In this experiment, the system(s) tested the efficacy of the proposed forensic similarity approach for determining whether two image patches were captured by the same or different camera model. To do this, during Learning Phase B the system(s) trained the similarity network using an expanded training dataset of 1,000,000 pairs of 256×256 image patches selected from camera models in A and B, with labels corresponding to whether the source camera model was the same or different. Evaluation was then performed on the evaluation dataset of 1,200,000 pairs chosen from camera models in A (known) and C (unknown).

FIG. 2.3 shows the accuracy of the proposed forensic similarity system, broken down by camera model pairing. The diagonal entries of the matrix show the correct classification rates of when two image patches were captured by the same camera model. The non-diagonal entries of the matrix show the correct classification rates of when two image patches were captured by different camera models. For example, when both image patches were captured by a Canon Rebel T3i the system correctly identified their source camera model as "the same" 98% of the time. When one image patch was captured by a Canon PowerShot A640 and the other image patch was captured by a Nikon CoolPix 5710, the system correctly identified that they were captured by different camera models 99% of the time.

The overall classification accuracy for all cases was 94.00%. The upper-left region shows classification accuracy for when two image patches were captured by known camera models, Casio EX-Z150 through iPhone 6s. The total accuracy for the known versus known cases was 95.93%. The upper-right region shows classification accuracy for when one patch was captured by an unknown camera model, Agfa DC-504 through Sony Cybershot DSC-T70, and the other patch was captured by a known camera model. The total accuracy for the known versus unknown cases was 93.72%. The lower-right region shows classification accuracy for when both image patches were captured by unknown camera models. For the unknown versus unknown cases, the total accuracy was 92.41%. This result shows that while the proposed forensic similarity system performs better on known camera models, the system is accurate on image patches captured by unknown camera models.

In the majority of camera model pairs, the proposed forensic similarity system is highly accurate, achieving >95% accuracy in 257 of the 325 unique pairings of all camera models, and 95 of the 120 possible pairs of unknown camera models. There are also certain pairs where the system does not achieve high comparison accuracy. Many of these cases occurred when two image patches were captured by similar camera models of the same manufacturer. As an example, when one camera model was an iPhone 6 and the other an iPhone 6s, the system only achieved a 26% correct classification rate. This was likely due to the similarity in hardware and processing pipeline of both of these cellphones, leading to very similar forensic traces. This phenomenon was also observed in the cases of Canon Powershot A640 versus Canon Ixus 55, any combination of LG phones, Samsung Galaxy S6 Edge versus Samsung Galaxy Lite, and Nikon Coolpix 53700 versus Nikon D3000.

The results of this experiment show that the proposed forensic similarity system is effective at determining whether two image patches were captured by the same or different camera model, even when the camera models were unknown, i.e. not used to train the system. This experiment also shows that, while the system achieves high accuracy in most cases, there are certain pairs of camera models where the system does not achieve high accuracy and this often due to the underlying similarity of the camera model systems themselves.

1) Patch Size and Re-Compression Effects: A forensic investigator may encounter smaller image patches and/or images that have undergone additional compression. In this experiment, the system(s) examined the performance of the proposed system when presented with input images that have undergone a second JPEG compression and when the patch size is reduced to a of size 128×128.

To do this, the inventors repeated the above source camera model comparison experiment in four scenarios: input patches with size 256×256, input patches of size 128×128, JPEG recompressed patches of size 256×256, and finally JPEG recompressed patches of size 128×128. The system(s) first created a copies of the training dataset and evaluation dataset, but where each image was JPEG compressed by quality factor 95 before extracting patches. The inventors then trained the similarity network (Learning Phase B) in each of the four scenarios. For experiments with 128×128 patches, the system(s) used the same 256×256 patches but cropped so only the top-left corner remained.

Source camera model comparison accuracy for each scenario is shown in Table II (FIG. 8.2). The column K, K indicates when both patches were from known camera models, K, U when one patch was from a known camera model and one from an unknown camera model, and finally U, U indicates when both were from unknown camera models. Generally, classification accuracy decreased when using the smaller 128×128 patches and when secondary JPEG compression was introduced. For example, total classification rates decreased from 93.61% for 256×256 patches to 92.64% for 128×128 patches without compression and from 91.83% for 256×256 patches to 88.63% for 128×128 patches with compression.

The results of this experiment show that operating at a finer resolution and/or introducing secondary JPEG compression negatively impacts source camera model comparison accuracy. However, the proposed system is still able to operate at a relatively high accuracy in these scenarios.

2) Other Approaches: In this experiment, the inventors compared the accuracy of the proposed approach to other approaches including distance metrics, support vector machines (SVM), extremely randomized trees (ER Trees), and prior art]. For the machine learning approaches, the system(s) trained each method on deep features of the training dataset extracted by the feature extractor after Learning Phase A. The inventors did this to emulate Learning Phase B where the machine learning approach is used in place of the proposed similarity network.

They compared a support vector machine (SVM) with RBF kernel ry=0.01, C=1.0, and an extremely randomized trees (ER Trees) classifier with 800 estimators and minimum split depth of 3. They also compared to the method proposed in earlier art and used the same training and evaluation data as with the proposed method.

For the distance measures, the system(s) extracted deep features from the evaluation set after Learning Phase B. This was done to give a more fair comparison to the machine learning systems, which have the benefit of the additional training data. The system(s) measured the distance between each pair of deep features and compared to a threshold. The threshold for each approach was chosen to be the one that maximized total accuracy.

The total classification accuracy achieved on the evaluation set is shown in Table III (FIG. 8.3), with the proposed system accuracy of 93.61% shown for reference. For the fixed distance measures, the 2-Norm distance achieved the highest accuracy of 93.28%, and the Infinite Norm distance achieved the lowest accuracy, among those tested, at 91.73%. The Bray-Curtis distance, which was used in earlier work to cluster image patches based on source camera model, achieved an accuracy of 92.57%.

For the learned measures, the ER Trees classifier achieved an accuracy of 92.44% and the SVM achieved an accuracy of 92.84%, both lower than the proposed similarity system. The inventors also compared against the system proposed in the other previous work, which achieved a total accuracy of 85.70%. The results of this experiment show that the proposed system outperforms other distance measures and learned similarity measures. The experiment also shows the system proposed significantly improves upon prior work, and decreased the system error rate by over 50%.

3) Training methods: In this experiment, the inventors examined the effects of two design aspects in the Learning Phase B training procedure. In particular, these aspects are 1) allowing the feature extractor to update, i.e. unfrozen during training, and 2) using a diverse training dataset. This experiment was conducted to explicitly compare to the training procedure in the art, where the feature extractor was not updated (frozen) in Learning Phase B and only a subset of available training camera models were used.

To do this, the inventors created an additional training database of 400,000 image patch pairs of size 256×256, mimicking the original training dataset, but containing only image patches captured by camera models in set B. This was done since the procedure in specified to conduct Learning Phase B on camera models that were not used in Learning Phase A. The experimenters refer to this as training set B, and the original training set as AB. They then performed Learning Phase B using each of these datasets. Furthermore, they repeated each training scenario where the learning rate multiplier in each layer in the feature extractor layer was set to 0, i.e. The feature extractor was frozen. This was done to compare to the procedure previously that used a frozen feature extractor.

The overall accuracy achieved by each of the four scenarios is shown in Table IV (FIG. 8.4). When using training on set B with a frozen feature extractor, which is the same procedure used in other work, the total accuracy on the evaluation image patches was 90.24%. When allowing the feature extractor to update, accuracy increased by 0.72 percentage points to 90.96%. When increasing training data diversity to camera model set AB, but using a frozen feature extractor the accuracy achieved was 92.56%. Finally, when using a diverse dataset and an unfrozen feature extractor, total accuracy achieved was 93.61%.

The results of this experiment show that the proposed training procedure is a significant improvement over the earlier procedure, improving accuracy 3.37 percentage points. Furthermore, the inventors can see the added benefit of the proposed architecture enhancements when comparing the result MS'18 in Table III (FIG. 8.3), which uses both the training procedure and system architecture of earlier procedures. Improving the system architecture alone raised classification rates from 85.70% to 90.24%. Improving the training procedure further raised classification rates to 93.61%, together reducing the error rate by more than half.

2.4.B Editing Operation Comparison

A forensic investigator is often interested in determining whether two image patches have the same processing history.

In this experiment, the inventors investigated the efficacy of the proposed approach for determining whether two image patches were manipulated by the same or different editing operation, including "unknown" editing operations not used to train the system.

To do this, the system(s) started with the training database of image patch pairs. The system(s) then modified each patch with one of the eight "known" manipulations in Table V (FIG. 8.5), with a randomly chosen editing parameter. The inventors manipulated 50% of the image patch pairs with the same editing operation, but with different parameter, and manipulated 50% of the pairs with different editing operations. The known manipulations were the same manipulations used in other art. The system(s) repeated this for the evaluation database, using both the "known" and "unknown" manipulations. Wiener filtering was performed using the SciPy python library, web dithering was performed using the Python Image Library, and salt and pepper noise was performed using the SciPy image processing toolbox (skimage). The inventors note that the histogram equalization and JPEG compression manipulations were performed on the whole image. The inventors then performed Learning Phase B using the manipulated training database, with labels associated with each pair corresponding to whether they have been manipulated by the same or different editing operation. Finally, the inventors evaluated accuracy on the evaluation dataset, with patches processed in a similar manner.

Table VI (FIG. 8.6) shows the correct classification rates of the pro-posed forensic similarity system, broken down by manipulation pairing. The first eight columns show rates for when one patch was edited with a known manipulation and the other patch was edited with an unknown manipulation. The last three columns show rates for when both patches were edited by unknown manipulations. For example, when one image patch was manipulated with salt and pepper noise and the other patch was manipulated with histogram equalization, the proposed system correctly identified that they have been edited by different manipulations at a rate of 95%. When both image patches were edited with Wiener filtering, the proposed system correctly identified that they were edited by the same manipulation at a rate of 96%. The total accuracy for the known versus known cases was 97.0%, but are not shown for the sake of brevity.

There are certain pairs of manipulations for which the proposed system does not achieve high comparison accuracy. These include Wiener filtering versus Gaussian blurring, web dithering versus sharpening, salt and pepper versus sharpening, and web dithering versus salt and pepper noise. The first example is likely due to the smoothing similarities between Wiener filtering and Gaussian blurring. The latter cases are likely due to the addition of similar high frequency artifacts introduced by the sharpening, web dithering, and salt and pep-per manipulations. Despite these cases, the proposed system achieves high accuracy even when one or both manipulations are unknown in the majority of manipulation pairs.

The results of this experiment demonstrate that the proposed forensic similarity is system is effective at comparing the processing history of image patches, even when image patches have undergone an editing operation that was unknown, i.e. not used during training.

2.4.0 Editing Parameter Comparison

In this experiment, the inventors investigated the efficacy of the proposed approach for determining whether two image patches have been manipulated by the same or different manipulation parameter. Specifically, the inventors examined pairs of image patches that had been resized by the same scaling factor or that had been resized by different scaling factors, including "unknown" scaling factors that were not used during training. This type of analysis is important when analyzing spliced images where both the host image and foreign content were resized, but the foreign content was resized by a different factor.

To do this, the inventors started with the training database of image patch pairs. The inventors then resized each patch with one of the seven "known" resizing factors in $\{0.6, 0.7, 0.9, \text{None}, 1.1, 1.3, 1.5\}$ using bilinear interpolation. The system(s) resized 50% of the image patch pairs with the same scaling factor, and resized 50% of the pairs with different scaling factors. The system(s) repeated this for the evaluation database, using both the "known" scaling factors and "unknown" scaling factors in $\{0.8, 1.2, 1.4\}$. The system(s) then performed Learning Phase B using the training database of resized image patches, with labels corresponding to whether each pair of image patches was resized by the same or different scaling factor.

The correct classification rates of the proposed approach are shown in FIG. 2.4, broken down by tested resizing factor pairings. For example, when one image patch was resized by a factor of 0.8 and the other image patch was resized by a factor of 1.4, both unknown scaling factors, the proposed system correctly identified that the image patches were resized by different scaling factors at rate of 99%. Cases where at least one patch has been resized with an unknown scaling factor are highlighted in blue. Cases where both patches have been resized with an unknown scaling factor the outlined in red.

The system achieves greater than 90% correct classification rates in 33 of 45 tested scaling factor pairings. There are also some cases where the proposed system does not achieve high accuracy. These cases tend to occur when presented with image patches that have been resized with different but similar resizing factors. For example, when resizing factors of 1.4 and 1.3 are used, the system correctly identifies the scaling factor as different 12% of the time.

The results of this experiment show that the proposed approach is effective at comparing the manipulation parameter in two image patches, a third type of forensic trace. This experiment shows that the proposed approach is effective even when one or both image patches have been manipulated by an unknown parameter of the editing operation not used in training.

2.5 Practical Applications

The forensic similarity approach is a versatile technique that is useful in many different practical applications. In this section, the inventors demonstrate how a forensic similarity is used in two types of forensic investigations: image forgery detection and localization, and image database consistency verification.

2.5.A Forgery Detection and Localization

Here the system(s) demonstrate the utility of the proposed forensic similarity system in the important forensic analysis of forged images. In forged images, an image is altered to change its perceived meaning. This can be done by inserting foreign content from another image, as in a splicing forgery, or by locally manipulating a part of the image. Forging an image inherently introduces a localized inconsistency of the forensic traces in the image. The system(s) demonstrate that the proposed similarity system detects and localizes the forged region of an image by exposing that it has a different forensic trace than the rest of the image. Importantly, the system(s) show that the proposed system is effective on "in-the-wild" forged images, which are visually realistic and have been downloaded from a popular social media website. The system(s) do this on three forged images that were downloaded from www.reddit.com, for which the system(s) also have access to the original version. First, the system(s) subdivided each forged image into image patches with 50% overlap. Next, the system(s) selected one image patch as a reference patch and calculated the similarity score to all other image patches in the image. The system(s) used the similarity system trained in Sec. 2.4.A to determine whether two image patches were captured by the same or different camera model with secondary JPEG compression. The system(s) then highlighted the image patches with similarity scores less than a threshold, i.e. contain a different forensic trace than the reference patch.

Results from this procedure on the first forged image are shown in FIG. 2.5(a)-(h). The original image is shown in FIG. 2.5(a). The spliced version is shown FIG. 2.5(b), where an actor was spliced into the image. When the system(s) selected a reference patch from the host (original) part of the image, the image patches in the spliced regions were highlighted as forensically different as shown in FIG. 2.5(c). The inventors note that the forensic similarity based approach is agnostic to which regions are forged and which are authentic, just that they have different forensic signatures. This is seen in FIG. 2.5(d) when the system(s) selected a spliced image patch as the reference patch. FIG. 2.5(e) shows then when the system(s) performed this analysis on the original image, the forensic similarity system does not find any forensically different patches from the reference patch.

The second row of the figures shows forensic similarity analysis using networks trained under different scenarios. Results using the network trained to determine whether two image patches have the same or different source camera model without JPEG post-compression are shown in FIG. 2.5(f) for patch size 256×256, in FIG. 2.5(g) for patch size 128×128, and with JPEG post-compression in FIG. 2.5(h) for patch size 128×128. The result using the network trained to determine whether two image patches have been manipulated by the same or different manipulation type is shown in FIG. 2.5(i).

Results from splicing detection and localization procedure on a second forged image are shown in FIG. 2.6(a)-(c), where a set of toys were spliced into an image of a meeting of government officials. When the inventors selected reference patches from the host image, the spliced areas were correctly identified as containing a different forensic traces, exposing the image as forged. This is seen in FIG. 2.6(b) with 256×256 patches, and in FIG. 2.6(c) with 128×128 patches. The 128×128 case showed better localization of the spliced region and additionally identified the yellow airplanes as different than the host image, which were not identified by the similarity system using larger patch sizes. In a final example, shown in FIGS. 2.7(a)-(d), the raindrop stains on a mans shirt were edited out the image by a forger using a brush tool. When the system(s) selected a reference patch from the unedited part of the image, the manipulated regions were identified as forensically different, exposing the tampered region of the image. This is seen in FIG. 2.7(c) with 256×256 patches, and in FIG. 2.7(d) with 128×128 patches. In the 128×128 case, the smaller patch size was able to correctly expose that the man's shirt sleeve was also edited.

The results of presented in this section show that the proposed forensic similarity based approach is a powerful technique that can be used to detect and localize image forgeries. These results showed that just correctly identifying that forensic differences existed in the images was sufficient to expose the forgery, even though the technique did not identify the particular forensic traces in the image.

2.5.B Database Consistency Verification

In this section, the inventors demonstrate a that the forensic similarity system detects whether a database of images has either been captured by all the same camera model, or by different camera models. This is an important task for social media websites, where some accounts illicitly steal copyrighted content from many different sources. The system(s) refer to these accounts as "content aggregators", who upload images captured by many different camera models. This type of account contrasts with "content generator" accounts, who upload images captured by one camera model. In this experiment, the system(s) show how forensic similarity is used to differentiate between these types of accounts.

To do this, the inventors generated three types of databases of images. Each database contained M images and were assigned to one of three "Types." Type 0 databases contained M images taken by the same camera model, i.e. a content generator database. Type 1 databases contained M 1 images taken by one camera model, and 1 image taken by a different camera model. Finally, Type 2 databases contain M images, each taken by different camera models. The system(s) consider the Type 1 case the hardest to differentiate from a Type 0 database, whereas the Type 2 case is the easiest to detect. The system(s) created 1000 of each database type from images captured by camera models in set, i.e. unknown camera models not used in training, with the camera models randomly chosen for each database.

To classify a database as consistent or inconsistent, the system(s) examined each ($M_2$) unique image pairings of the database. For each image pair, the system(s) randomly selected N 256×256 image patches from each image and calculated the N2 similarity scores across the two images. Similarity was calculated using the similarity network trained in Sec. 2.4.A. Then, the system(s) calculated the median value of scores for each whole-image pair. For image pairs captured by the same camera model this value is high, and for two images captured by different camera models this value is low. The system(s) then compare the (M−2)th lowest value calculated from the entire database to a threshold. If this (M−2)th lowest value is above the threshold, the system(s) consider the database to be consistent, i.e. from a content generator. If this value is below the threshold, then the system(s) consider the database to be inconsistent, i.e. from a content aggregator.

Table VII (FIG. 2.8.7) shows the rates at which the system(s) correctly classify Type 0 databases as "consistent" (i.e. all from the same camera model) and Type 1 and Type 2 databases as "inconsistent", with M=10 images per database, and N=20 patches chosen from each image. For a threshold 0.5, the system(s) correctly classified 92.4% of Type 0 databases as consistent, and incorrectly classified 8.1% of Type 1 databases as consistent. This incorrect classification rate of Type 1 databases is decreased by increasing the threshold. Even at a very low threshold of 0.1, the system correctly identified all Type 2 databases as inconsistent. The results of this experiment show that the proposed forensic similarity system is effective for verifying the consistency of an image database, an important type of practical forensic analysis. Since none of the images used in this experiment were from camera models used to train the forensic system, an identification type approach would not have been appropriate. In this application it was not important to identify which camera models were used in a particular database, but whether the images came from the same or different camera models.

3. Hardware

The system and method may be implemented using system and hardware elements shown and described herein. For example, a network with one or more clients may be local machines, personal computers, mobile devices, servers, tablets that communicate through one or more networks with servers. It should be appreciated that a client may serve as a client seeking access to resources provided by a server and/or as a server providing access to other clients.

The network may be wired or wireless links. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way.

The network may be located across many geographies and may have a topology organized as point-to-point, bus, star, ring, mesh, or tree. The network may be an overlay network which is virtual and sits on top of one or more layers of other networks.

A system may include multiple servers stored in high-density rack systems. If the servers are part of a common network, they do not need to be physically near one another but instead may be connected by a wide-area network (WAN) connection or similar connection.

Management of group of networked servers may be de-centralized. For example, one or more servers may include modules to support one or more management services for networked servers including management of dynamic data, such as techniques for handling failover, data replication, and increasing the networked server's performance.

The servers may be file servers, application servers, web servers, proxy servers, network appliances, gateways, gateway servers, virtualization servers, deployment servers, SSL VPN servers, or firewalls.

When the network is in a cloud environment, the cloud network may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications.

A client may access IaaS, PaaS, or SaaS resources using preset standards and the clients may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The clients and servers may be embodied in a computer, network device or appliance capable of communicating with a network and performing the actions herein. The device may include a system bus that connects the major components of a computer system, combining the functions of a data bus to carry information, an address bus to determine where it should be sent, and a control bus to determine its operation. The device includes a central processing unit, a main memory, and storage device. The device may further include a network interface, an installation device and an I/O control connected to one or more display devices, I/O devices, or other devices like mice and keyboards.

The storage device may include an operating system, software, and a network user behavior module, in which may reside the network user behavior system and method described in more detail below.

The computing device may include a memory port, a bridge, one or more input/output devices, and a cache memory in communication with the central processing unit.

The central processing unit may be a logic circuitry such as a microprocessor that responds to and processes instructions fetched from the main memory. The CPU may use instruction level parallelism, thread level parallelism, different levels of cache, and multi-core processors. A multi-core processor may include two or more processing units on a single computing component.

The main memory may include one or more memory chips capable of storing data and allowing any storage location to be directly accessed by the CPU. The main memory unit may be volatile and faster than storage memory. Main memory units may be dynamic random access memory (DRAM) or any variants, including static random access memory (SRAM). The main memory or the storage may be non-volatile.

The CPU may communicate directly with a cache memory via a secondary bus, sometimes referred to as a backside bus. In other embodiments, the CPU may communicate with cache memory using the system bus. Cache memory typically has a faster response time than main memory and is typically provided by SRAM or similar RAM memory.

Input devices may include smart speakers, keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include the same smart speakers, video displays, graphical displays, speakers, headphones, inkjet printers, laser printers, and 3D printers.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices may be connected to the I/O controller. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMO-LED) displays, liquid crystal laser displays, time-multiplexed optical shutter (TMOS) displays, or 3D displays.

The computing device may include a network interface to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections may be established using a variety of communication protocols. The computing device may communicate with other computing devices via any type and/or form of gateway or tunneling protocol such as Secure Socket Layer (SSL) or Transport Layer Security (TLS). The network interface may include a built-in network adapter, network interface card, PCMCIA network card, EXPRESSCARD network card, card bus network adapter, wireless network adapter, USB network adapter, modem or any other device suitable for interfacing the computing device to any type of network capable of communication and performing the operations described herein.

The computing device may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system may be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

While the invention has been described with reference to the embodiments above, a person of ordinary skill in the art would understand that various changes or modifications may be made thereto without departing from the scope of the claims.

The invention claimed is:

1. A forensic similarity system for detecting forensic similarity for digital images, the forensic similarity system comprising:
a comparator that compares at least two digital image patches of a digital image to determine whether the at least two digital image patches have the same or different forensic trace, wherein the comparator comprises a feature extractor that extracts forensic information from digital image patches of the digital image, and processes the forensic information using a similarity function that maps pairs of forensic features of the digital image patches to generate a similarity score that indicates similarity between the digital image patches corresponding to whether the at least two digital image patches have the same or different forensic trace, wherein the feature extractor comprises a convolutional neural networks (CNN)-based feature extractor that maps the digital image onto a low-dimensional feature space that encodes the forensic information, wherein the comparator applies a comparison function C: $X \times X \rightarrow \{0, 1\}$, where X is a space of the digital image patches, wherein the mapping is such that for two inputs $X1 \in X$, $X2 \in X$, the comparison function maps to either 0 or 1, where output of 0 indicates that a source of the at least two digital image patches are different, and an output of 1 indicates that a source of the at least two digital image patches is the same; and
a three-layer neural network that maps the pairs of forensic features to generate the similarity score;
wherein the forensic similarity system is trained using a learning phase in which the CNN includes five convolutional blocks and two fully connected layers, wherein each convolutional block, with the exception of the first convolutional block, comprises a convolutional layer followed by batch normalization, hyperbolic tangent activation, and finally a pooling operation.

2. The forensic similarity system of claim 1, wherein a low similarity score indicates that the digital image patches have dissimilar forensic traces.

3. The forensic similarity system of claim 1, wherein the similarity score is compared to a predetermined threshold, and wherein similarity scores above the predetermined threshold indicate that the digital image patches have similar forensic traces.

4. The forensic similarity system of claim 1, wherein each of the two fully connected layers includes 200 neurons with hyperbolic tangent activation.

5. The forensic similarity system of claim 1, wherein in use, the digital image patches are communicated to the CNN, and then activated neuron values in the last fully connected layer are recorded and used as a feature vector that represents forensic information about the digital image.

6. The forensic similarity system of claim 5, wherein the forensic similarity system uses full color RGB digital image patches.

7. The forensic similarity system of claim 1, wherein the forensic similarity system trains the feature extractor on a closed set of forensic traces.

8. The forensic similarity system of claim 6, wherein the convolutional layer includes a convolutional kernel with a dimension of 5×5×3, where the 3 dimension corresponds to an image's RGB channel.

* * * * *